US010210494B2

(12) United States Patent
Frost et al.

(10) Patent No.: US 10,210,494 B2
(45) Date of Patent: Feb. 19, 2019

(54) PROVIDING CONTENT TO A TARGET NETWORK THAT HAS INSUFFICIENT CONNECTIVITY TO A SOURCE NETWORK

(75) Inventors: Scott Frost, Foster City, CA (US); Sean M. Knapp, Mountain View, CA (US)

(73) Assignee: OOYALA, INC., Mountain View, CA (US)

( * ) Notice: Subject to any disclaimer, the term of this patent is extended or adjusted under 35 U.S.C. 154(b) by 904 days.

(21) Appl. No.: 13/327,199

(22) Filed: Dec. 15, 2011

(65) Prior Publication Data
US 2012/0290436 A1 Nov. 15, 2012

Related U.S. Application Data

(60) Provisional application No. 61/484,605, filed on May 10, 2011.

(51) Int. Cl.
*G06Q 20/00* (2012.01)
*G06Q 20/12* (2012.01)
*G06Q 30/06* (2012.01)
*H04L 29/08* (2006.01)

(52) U.S. Cl.
CPC ........... *G06Q 20/123* (2013.01); *G06Q 30/06* (2013.01); *G06Q 30/0635* (2013.01); *H04L 67/10* (2013.01); *H04L 67/2852* (2013.01)

(58) Field of Classification Search
CPC ............... G06Q 30/06; G06Q 30/0613; G06Q 30/0635; G06Q 20/123
USPC ...................................................... 705/26.41
See application file for complete search history.

(56) References Cited

U.S. PATENT DOCUMENTS

| 6,810,527 | B1* | 10/2004 | Conrad | H04N 7/163 348/E7.061 |
| 6,993,590 | B1 | 1/2006 | Gauthier | |
| 8,176,520 | B1* | 5/2012 | Mitchell | H04N 7/18 455/552.1 |
| 8,467,773 | B1* | 6/2013 | Soelberg | H04W 4/16 455/414.1 |

(Continued)

OTHER PUBLICATIONS

Field, D. and Rosato, D., Boeing Planes soon will boast Net, TV, e-mail Speedy Internet access, live shows coming in 2001, Apr. 27, 2000, USA Today, ISSN 0734-7456, 1B(1). (Year: 2000).*

(Continued)

*Primary Examiner* — Jason B Dunham
*Assistant Examiner* — Brittany E Bargeon
(74) *Attorney, Agent, or Firm* — Hickman Palermo Becker Bingham LLP

(57) ABSTRACT

Techniques are provided for remotely controlling the distribution of digital assets to users in less-connected venues. When digital assets are cached within the less-connected venues, users within those less-connected venues are better able consume the assets, and are therefore more likely to purchase rights to consume the assets. Users within a less-connected venue may purchase and consume assets while the target network is completely disconnected from the source network from which the digital asset distribution is controlled. Sessions that are initiated within less-connected venues may be transferred outside those venues, to allow users that have purchased assets to continue to consume those assets after they leave the less connected venues.

27 Claims, 4 Drawing Sheets

(56) References Cited

U.S. PATENT DOCUMENTS

| | | | |
|---|---|---|---|
| 8,468,214 B1* | 6/2013 | Bourlas | H04L 67/12 709/217 |
| 2003/0093798 A1* | 5/2003 | Rogerson | 725/75 |
| 2003/0202533 A1* | 10/2003 | Taylor | H04B 7/18519 370/468 |
| 2004/0064497 A1* | 4/2004 | Debey | 709/201 |
| 2005/0132407 A1 | 6/2005 | Boyer | |
| 2005/0149455 A1 | 7/2005 | Buresewitz | |
| 2006/0112143 A1* | 5/2006 | Subramanian | G06F 17/30017 |
| 2006/0173974 A1* | 8/2006 | Tang | H04L 63/029 709/217 |
| 2008/0177668 A1 | 7/2008 | Delean | |
| 2008/0240061 A1* | 10/2008 | Lynch | H04B 7/18508 370/338 |
| 2008/0250061 A1* | 10/2008 | Kim | G11B 27/11 |
| 2008/0270686 A1* | 10/2008 | Grannan | G06Q 30/02 711/113 |
| 2008/0274689 A1* | 11/2008 | Kuban | 455/7 |
| 2010/0217824 A1* | 8/2010 | Stiemerling | H04W 4/02 709/217 |
| 2012/0005761 A1* | 1/2012 | Caceres | G06Q 30/01 726/28 |
| 2012/0090011 A1* | 4/2012 | Ezaki et al. | 725/76 |
| 2012/0230293 A1* | 9/2012 | Grinshpun et al. | 370/331 |
| 2013/0238761 A1* | 9/2013 | Raleigh | H04L 67/306 709/219 |

OTHER PUBLICATIONS

Frost, U.S. Appl. No. 14/578,823, filed Dec. 22, 2014, Interview Summary, dated Feb. 8, 2017.

Frost, U.S. Appl. No. 14/578,823, filed Dec. 22, 2014, Office Action, dated Nov. 17, 2017.

Frost, U.S. Appl. No. 14/578,823, filed Dec. 22, 2014, Adviosry Action, dated Sep. 25, 2017.

Frost, U.S. Appl. No. 14/578,823, filed Dec. 22, 2014, Final Office Action dated Jul. 11, 2018.

Frost, U.S. Appl. No. 14/578,823, filed Dec. 22, 2014, Advisory Action dated Oct. 3, 2018.

* cited by examiner

ID

PROVIDING CONTENT TO A TARGET NETWORK THAT HAS INSUFFICIENT CONNECTIVITY TO A SOURCE NETWORK

CROSS-REFERENCE TO RELATED APPLICATIONS; BENEFIT CLAIM

This application claims the benefit of Provisional Appln. 61/484,605, filed May 10, 2011, the entire contents of which is hereby incorporated by reference as if fully set forth herein, under 35 U.S.C. § 119(e).

FIELD OF THE INVENTION

The present invention relates to providing access to digital assets in disconnected, sporadically connected, or weakly connected network environments.

BACKGROUND

With the widespread use of the Internet and the prevalence of wireless access points, people are growing accustomed to being able to access whatever data they want, whenever and wherever they want it. Unfortunately, there continue to be venues in which access to a network has a desired digital asset (a "source network") is slow, sporadic, or impossible. For example, moving vehicles, such as airplanes, cars, ships and trains, may move in and out of range of wireless access points. Even when within range, the bandwidth of the connection between such vehicles and the source network is often far less than that desired by the occupants.

In some cases, venues that have a slow or sporadic connection to a source network have a fast and reliable connection to a local network. For example, a cruise ship or airplane may have a relatively fast local area network that is always available to its passengers. Such local networks are referred to herein as "target networks".

Unfortunately, target networks frequently do not have the capacity to contain all of the data the passengers could possibly want to access. Consequently, even when a relatively fast target network is available, users are severely handicapped when the communication channel between that target network and the source network is slow, sporadic, or becomes severed.

As used herein, a "less-connected venue" refers to any venue in which computing device users have relatively fast access to a target network, but the target network has relatively slow, sporadic, or no access to a higher-capacity source network. Examples of less-connected venues include moving vehicles, such as airplanes, trains and ships. In these venues, the target network is the on-board network with which passenger devices can establish connections, while the source network is a land-based network that does not move in conjunction with the moving vehicles. In such cases, the source network is typically the Internet, or a wireless network (e.g. 3G, 4G) whose transmission stations are land-based and/or stationary. However, less-connected venues may also be stationary, such as hotels whose connection to the Internet is insufficient to allow all customers to concurrently stream videos from the Internet into their hotel rooms.

Unfortunately, it is not possible to provide users that are in a less-connected venue all of the resources that are available to users that are connected to a source network. For example, the target network on an airplane does not have the capacity to hold all movies that air passengers may desire to view. Further, depending on the flight path, an airplane's connection with an air-to-ground network may periodically become severed. Even if it were possible to reliably maintain a connection with the air-to-ground network, the bandwidth of the connection would generally be insufficient to allow all passengers to stream their desired content from the source network.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described hereafter for controlling the distribution of digital assets to users in less-connected venues. For the purpose of explanation, examples shall be given in which the users are airplane passengers, and that digital assets that are distributed to the users are digital videos. However, the techniques described herein are not limited to any particular type of less-connected venue, and the digital assets that are distributed to the users are not limited to any particular type of digital asset.

The ability to have secure control over the distribution of digital assets to users in less-connected venues increases the likelihood that content owners and distributors would allow copies of those assets to be cached within the less-connected venues. When cached within the less-connected venues, users within those less-connected venues are better able to consume the assets, and are therefore more likely to purchase rights to consume the assets.

Techniques are described hereafter that allow users within a less-connected venue to purchase and consume assets while the target network is completely disconnected from the source network from which the digital asset distribution is controlled. When the connection between the target network and the source network is re-established, a bi-directional sync is performed where purchase information, usage information, and session state information that was queued in the target network during the disconnected period is transferred to the source network, and authentication and control messages are communicated from the source network to the target network.

Techniques are also described herein for allowing sessions that are initiated within less-connected venues to be transferred outside those venues, to allow users that have purchased assets to continue to consume those assets after they leave the less connected venues. For example, a user that has purchased a movie on an airplane can leave the airplane and resume watching the movie on another type of device, running a different platform, connected to a different network.

System Overview

Figure 1:
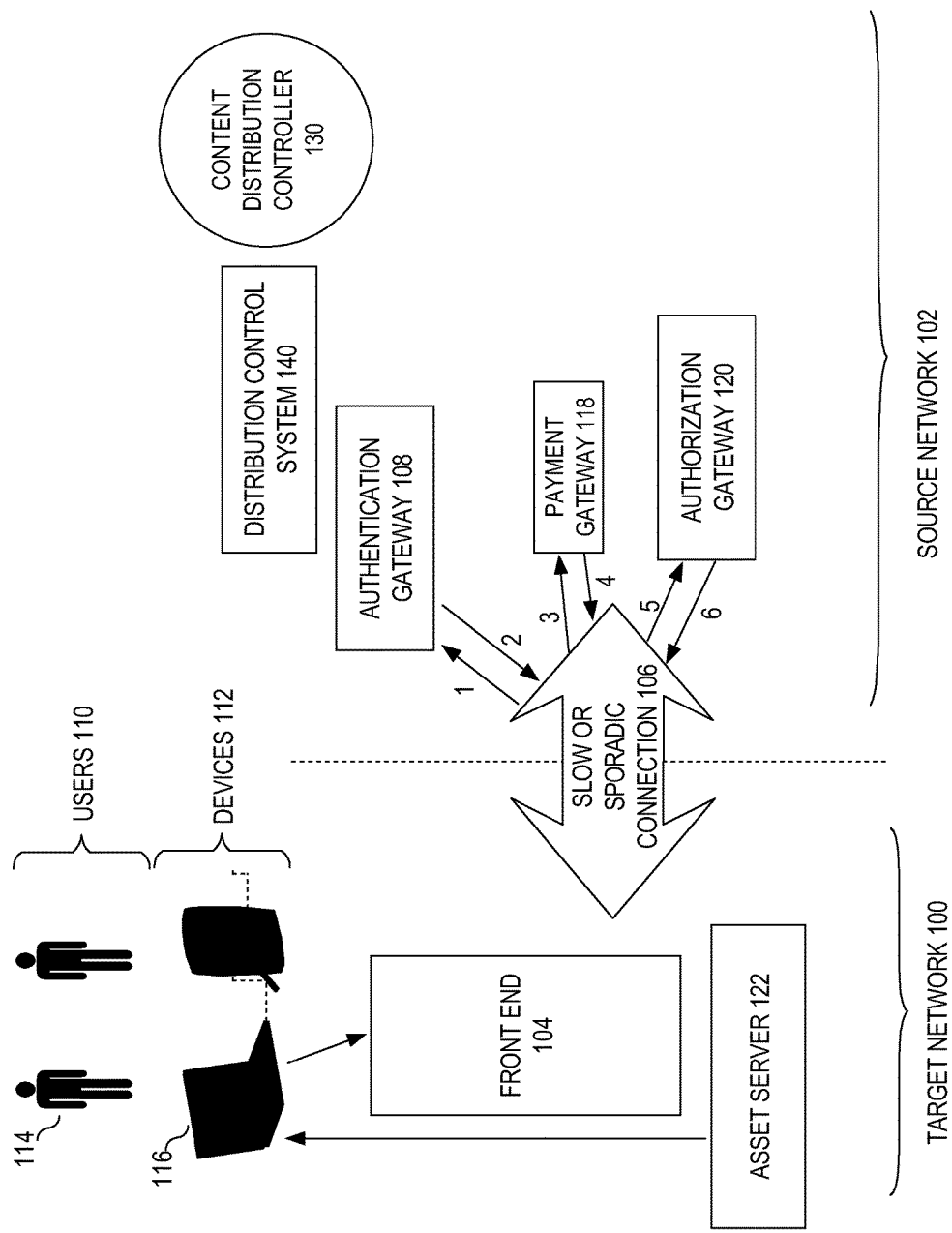
FIG. 1 is a block diagram of a less-connected venue in which digital assets are distributed from a source network to a target network, according to an embodiment of the invention.

Referring to FIG. 1, it is a block diagram that illustrates a system configured to provide assets to users in a less-connected venue, according to an embodiment of the invention. In the less-connected venue illustrated in FIG. 1, a target network 100 communicates with a source network 102 over a slow or sporadic connection 106. In the context less-connected venues, the connection 106 between the target network 100 and the source network 102 may be considered "slow" if the connection 106 does not have sufficient bandwidth to meet the demands of users within target network 100 for digital assets on source network 102. Thus, even very fast connections may be slow, if the demand for data over the connections exceeds their capacity.

For the purpose of illustration, it shall be assumed that target network 100 is a network aboard an airplane, while source network 102 is the Internet. Under these circumstances, the target network 100 may include a Central Processor Unit (ACPU), and the slow or sporadic connection 106 may be an air-to-ground network, which has relatively low bandwidth when connected, and can become disconnected during flight (e.g. when the airplane crosses the ocean).

Due to the cost associated with air-to-ground network communication equipment (which includes both the equipment cost and the cost of additional fuel consumption), many airplanes are not equipped with air-to-ground network communication equipment. Thus, for airplanes that are not equipped with air-to-ground network communication equipment, connection 106 represents the connection that the airplanes may be able establish when docked, or being serviced on the ground between flights. Such between-flight connections are often short relative to the flights themselves, during which the airplane's target network 100 operates in a disconnected state.

In the airplane, users 110 use devices 112 to connect to the target network 100. Devices 112 may be any form of device capable of consuming digital assets. Typical devices 112 are laptop computers, PDAs, tablets, or built-in entertainment devices. However, the techniques described herein are not limited to any particular type of digital-asset consuming device.

In the illustrated embodiment, the system that enables users 110 to use devices 112 to consume digital assets while in the less-connected venue includes several components within the target network 100, and several components within the source network. In particular, in the illustrated embodiment, asset consumption in the less-connected venue involves a front end 104, a payment gateway 118, and an asset server 122 within the target network 100, and an authentication gateway 108 and an authorization gateway 120 within source network 102. Each of these components shall now be described in greater detail.

The Front End

The component within the target network 100 with which the devices 112 interact is represented as front end 104. Front end 104 may, for example, include a web server that provides a web interface that allows users 110 to select a movie, and to purchase a license to view the selected movie during the flight. According to one embodiment, the front end 104 sends to devices 112 a page that contains a catalogue of digital assets that have been made available for consumption during the flight.

While some digital assets may be provided to users 110 freely, consumption of other digital assets may require a purchase. Prior to allowing any for-purchase digital asset to be consumed by a user, front end 104 may request the identity of the user. For example, front end 104 may ask a user to log-in, either upon initial connection to the target network, or in response to the user's request to consume a for-purchase digital asset.

The process of verifying a user's identity is referred to as "authentication". Due to the limited capacity of target network 100, target network 100 may not have the resources that are required to authenticate users. Thus, completing the authentication operation may involve sending an authentication request over connection 106 to an authentication gateway that is connected to the source network 102. In FIG. 1, the lines identified by "1" represent the transmission of an authentication request from front end 104 to authentication gateway 108.

The authentication request sent by front end 104 to authentication gateway 108 may include, for example, a user-id and password provided by users 110 using devices 112. Such authentication requests generally do not consume large amounts of bandwidth. Consequently, traffic caused by authentication requests over connection 106 is typically minimal. However, if connection 106 has been severed (for example, while an airplane flies over an ocean), then authentication may be performed locally on target network 100, or may be deferred until connection 106 is re-established. When authentication has been deferred because connection 106 has been severed, the user may still be allowed to consume the asset, subject to later authentication once connection 106 has been re-established.

The Authentication Gateway

Authentication gateway 108 generally represents those components, connected to source network 102, that receive the authentication requests from front end 104, determine whether to grant the authentication requests, and send authentication responses back to target network 100. Authentication gateway 108 may, for example, determine whether a user-id/password combination provided in an authentication request matches any user-id/password combination in a database that is accessible to authentication gateway 108. The authentication response is indicated in FIG. 1 by line "2".

If the user-id/password combination in the authentication request matches a user-id/password combination in the database, then authentication gateway 108 sends an authentication response indicating that the user has been authenticated. If the user-id/password combination in the authentication request does not match any user-id/password combination in the database, then authentication gateway 108 sends an authentication response indicating that the user has not been authenticated. Under these circumstances, front end 104 may request the user to correct the provided information, or to provide information to open a new account.

User/id combinations are merely one mechanism by which users may be authenticated, and the techniques described herein are not limited to any particular mechanism of authenticating users. For example, rather than a user-id/ password, users may simply provide their names and billing information, or may simply enter their seat number (which may already be correlated to their identification information).

The Payment Gateway

After a user has been authenticated, the user may be permitted to consume freely distributed digital assets without further authorization. However, if the user requests consumption of a for-purchase asset, then front end 104 sends a payment execution request to payment gateway 118, as illustrated by lines "3" in FIG. 1. Payment gateway 118 provides the functionality required to execute the payments made for consumption of for-purchase digital assets. For example, payment gateway 118 may receive credit card information from users 110, verify that sufficient funds are present in the corresponding accounts, and transfer the purchase price of a for-purchase asset from the credit card account to the appropriate party.

The party that receives the money for the purchase of a for-purchase digital asset may vary from situation to situation. For example, in some situations, the purchase price of a movie during a flight may be initially transferred to the airline providing the flight. Alternatively, the purchase price may be transferred to a content distribution controller 130, to the owner of the digital asset, or to a third-party distributor of the asset.

Similar to authorization requests, payment execution requests generally do not consume large amounts of bandwidth. Consequently, traffic caused by payment requests over connection 106 is typically minimal. However, if connection 106 has been severed, then payment operations may be deferred until connection 106 is re-established. When payment has been deferred because connection 106 has been severed, the user may still be allowed to consume the asset, subject to later execution of the payment transaction once connection 106 has been re-established.

The Authorization Gateway

Authorization gateway 120 generally represents those components responsible for managing asset access and encryption policies. Those policies may take into account a variety of factors, such as duration, number of plays, location, content license, and time. For example, purchasing consumption of a particular asset may only allow a user to consume the asset twice. As another example, the asset may be a two-hour movie, and the policies may indicate that users may only watch the movie for three hours. As yet another example, an asset may have a policy that only allows the asset to be view once, between certain hours, within the United States. These are merely examples of the types of conditions that may be associated with assets whose distribution is carried out using the techniques described herein. The techniques are not limited to any particular conditions or distribution policies.

Whatever the policies for an asset are, those policies may be specified on a per-flight, per-asset, and even per-user basis. Authorization gateway 120 receives the authorization requests over connection 106 as illustrated by line "5", and responds with an authorization response that either grants or denies a license to consume the asset, as illustrated by line "6".

Similar to authorization requests and payment execution requests, traffic caused by authorization requests over connection 106 is typically minimal. However, if connection 106 has been severed, then authorization operations may be deferred until connection 106 is re-established. When authorization has been deferred because connection 106 has been severed, the user may still be allowed to consume the asset, subject to later authorization once connection 106 has been re-established.

The Asset Server

Asset server 122 generally represents those components, within target network 100, that deliver digital assets that are cached on target network 100 to devices 112 for consumption by users 110. In embodiments where the digital assets are digital videos, asset server 122 may include, for example, a video server. Asset server 122 makes the digital assets available in a manner consistent with the license obtained from authorization gateway 120. For example, if user 114 obtains a license to watch movie X for up to four hours, then four hours after user 114 begins watching movie X, asset server 122 will cease to make movie X available to user 114.

The Content Distribution Controller

According to one embodiment, a content distribution controller 130, that is connected to the source network 102, controls which digital assets are stored on target network 100, and of those digital assets, which ones are made available to the users 110 for consumption. In the context of airplane flights, content distribution controller 130 may control, on a per-flight basis, which movies are loaded in each airplane's system, which of those movies are made available for viewing, and the terms under which users 110 may watch those movies.

In one embodiment, content distribution controller 130 is able to manage the distribution of digital assets within multiple less-connected venues at a very detailed level. In one embodiment, content distribution controller 130 controls not only which movies are available for viewing on each of multiple flights, but also how those movies are presented in each of the flights, and the metadata for those movies that is maintained on the target networks of those flights.

The entity that controls distribution of digital assets may vary from implementation to implementation. For example, in some environments, content distribution controller 130 may be the publisher of the digital assets. In other environments, content distribution controller 130 may be the owner of the digital assets, or a third party distributor of the digital assets. In the context of movies on airplanes, the content distribution controller may be the owner of the movies, the publisher of the movies, the airlines, or any other party that has been tasked with coordinating the distribution of movies to airplanes.

Transferring Information to a Less-Connected Venue

The asset needs of users in a less-connected venue do not remain constant. Therefore, it is necessary to periodically load new assets into the target network 100. Because target network 100 has limited resources, loading new assets into the target network 100 often requires freeing up space by moving or deleting assets that are already on the target network.

Various techniques may be used to load new information onto a less-connected venue. For example, connection 106 may be used when available. Alternatively, there may be circumstances that allow temporary relatively high-speed connections between target network 100 and source network 102. For example, target network 100 may be the network on an airplane and connection 106 may be the connection between the airplane and ground during flight. However, for the brief periods during which the airplane is being serviced on the ground between flights, a high-speed connection may be established between the target network 100 and the source network 102, either wirelessly or through the use of physical cables.

Instead of or in addition to loading assets onto target network 100 through a connection to source network 102, assets may be loaded onto target network 100 manually. Specifically, removable storage may be connected to source network 102. The desired assets may be loaded onto the removable storage. The removable storage may then be disconnected from the source network 102 and connected to the target network 100. Once connected to the target network 100, the assets may be transferred from the removable storage to the target network 100.

Any form of removable storage may be used to carry out the transfer of assets from the source network 102 to the target network 100. For example, the removable storage may be a removable hard drive, a DVD, a USB drive, a FLASH drive, etc. Loading the assets onto target network 100 may involve:

connecting the removable storage to the target network 100, moving the assets from the removable storage onto storage that is permanently connected to target network 100, and disconnecting the removable storage from the target network 100.

Alternatively, the removable storage may simply be left connected to the target network 100. When the removable storage is left connected to the target network 100, asset server 122 may cache the assets elsewhere within target network 100 prior to serving the assets to user 100, or may serve the assets to users 110 from the removable storage, without making additional copies of the assets within the target network 100.

For example, when an airplane arrives at an airport, a flash drive that contains the assets that were offered on the flight that just ended may be disconnected from the airplane's target network 100, and a new flash drive that contains assets that are to be offered on the next flight may be connected to the target network 100. Using this storage-swapping technique, the amount of time that it takes to load the assets onto target network 100 is independent of the size and number of assets that need to be loaded.

Controlling Loaded Content

As mentioned above, content distribution controller 130 controls which content is made available in the less-connected venue. In the context of movies on airplanes, content distribution controller 130 may, for example, establish the following distribution schedule for the movies for flight X (from New York to Miami) and flight Y (from Miami to Houston), which are consecutive flights on the same airplane:

For flight X, movies A, B, and C will be on the target network. However, only movies A and C will be made available for consumption, while movie B is staged but not made available.

For flight Y, movies B, C and D will be on the target network. During flight Y, movies B and C are made available for consumption, while movie D is staged but not made available.

To carry out this distribution schedule, content distribution controller 130 may load the movies A, B, C and D onto a distribution control system 140 that is connected to source network 102. Distribution control system 140 determines where and when to send the movies A, B, C and D to satisfy the distribution schedule.

In the present example, a maintenance operator working in New York may use a computer to log in to a web interface provided by the distribution control system 140. In addition, the operator may plug into the computer a USB key to download any movies that are to be distributed to flight X. In response, distribution control system 140 determines, based on the key, the flight for which movies are requested. Once distribution control system 140 determines the target flight, distribution control system 140 causes the appropriate movies to be downloaded to the USB key.

In some situations, not all movies that are to distributed to a flight need to be downloaded prior to the flight. For example, if movies A and B are already stored on target network 100 of the airplane for flight X, only movie C is needs to be downloaded to carry out the distribution schedule set forth above. In one embodiment, distribution control system 140 keeps track of which movies are already on which airplanes, so as not to waste time and space downloading a movie that is already present.

After the appropriate movies have been downloaded to the USB key, the officer may connect the USB key to a computing device on target network 100. In the context of airplanes, the computing device may be an ACPU. Once the USB key is connected to the target network 100, the movies are transferred from the USB key to storage on the target network 100. After the transfer is complete, the USB key may be removed.

According to one embodiment, the movie files themselves are not all that is transferred from source network 102 to target network 100 to facilitate the distribution of movies to users 110. Rather, the addition information transferred may include, but is not limited to:

new catalog information that enables users 110 to be presented with a display that accurately depicts which digital assets are available for their selection;

thumbnail images for the movies that are to be offered for consumption;

metadata relating to the digital assets;

parameter values for the media player that is to be used to consume the assets, which may affect both the appearance and functionality of the media player;

data that instructs the ACPU within the target network 100 about which movies should be downloaded from the USB key, and which already-present movies should be deleted;

data that instructs the ACPU within the target network 100 about which movies are to be made available for consumption, and which are merely to be stages; and licensing information, indicating the terms under which the digital assets may be purchased/consumed.

Instead of, or in addition to, using removable storage (e.g. a USB key) to move some or all of the movies and related information from source network 102 to target network 100, other data transportation means may be used. For example, the catalog and metadata information for the movies for flight X may be transferred from source network 102 to target network 100 though a wireless and/or wired network connection established with the airplane while the airplane is docked between flights. When such connections have sufficient bandwidth, even the movies themselves may be transferred over the network connections, thereby eliminating the need to carry removable storage between computing devices on the two networks.

Target Network Components

Figure 2:
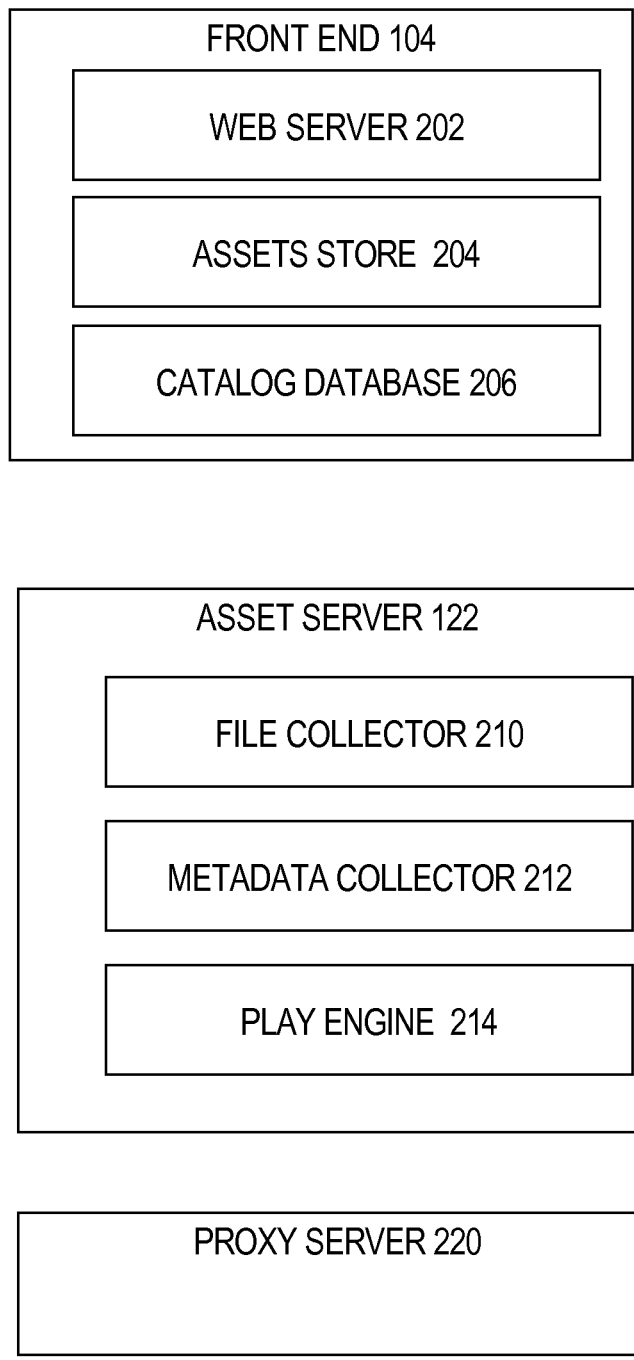
FIG. 2 is a block diagram that illustrates asset distribution components of a target network, according to an embodiment of the invention.

FIG. 2 is a block diagram that illustrates components of target network 100 in greater detail, according to one embodiment. As illustrated in FIG. 2, front end 104 includes a web server 202, an assets store 204, and a catalog database 206. Web server 202 receives and answers HTML requests from users 110. Assets store 204 houses and organizes video assets for the particular less-connected venue in which the front end 104 resides. In addition, assets store 204 presents the catalog of assets to users 110 to enable users 110 to select which digital assets they want to consume. Catalog database 206 associates the video assets with related data, such as trailers, tiles, descriptions, and price points. Catalog database 206 also receives updates for the metadata collector, which shall be described hereafter.

In the embodiment illustrated in FIG. 2, asset server 122 includes a file collector 210, a metadata collector 212 and a play engine 214. File collector 210 is the component responsible for listening for new content. When new content is detected (e.g. when a USB key is plugged into the target network 100), file collector 210 ingests the new content to the asset server 122. Metadata collector 212 polls and updates asset title, description, labels, thumbnails, purchase directives and other asset metadata. Play engine 214 provides playback of the assets.

As shall be described in greater detail hereafter, while target network 100 is connected to source network 102, components within source network 102 serve as the authority with respect to whether asset consumption purchases within target network 100 are approved. On the other hand, when target network 100 is disconnected from source network, the components within target network 100 temporarily assume authority for determining whether purchases may proceed. When target network 100 is reconnected, the local components synchronize with the components within source network 102 by communicating information about the purchases that occurred during the disconnected state.

The embodiment illustrated in FIG. 2 also includes proxy server 220, which proxies requests and redirects relevant requests to an ACPU for service. In addition, proxy server 220 provides a caching layer to reduce the traffic over connection 106. Specifically, data that (a) is obtained over connection 106 in response to a request, and (b) is likely to be requested in another request, is cached by proxy server 220, so that responding to the subsequent request does not require further use of connection 106.

In one embodiment, the cache managed by proxy server 220 is pre-loaded with content even before requests have been received for the content. For example, if a limited number of movies are going to be made available for viewing during a flight, some or all of those movies may be pre-loaded into cache so that traffic over connection 106 may be reduced or eliminated, even for the first request for a particular asset.

Distribution Control System

Figure 3:
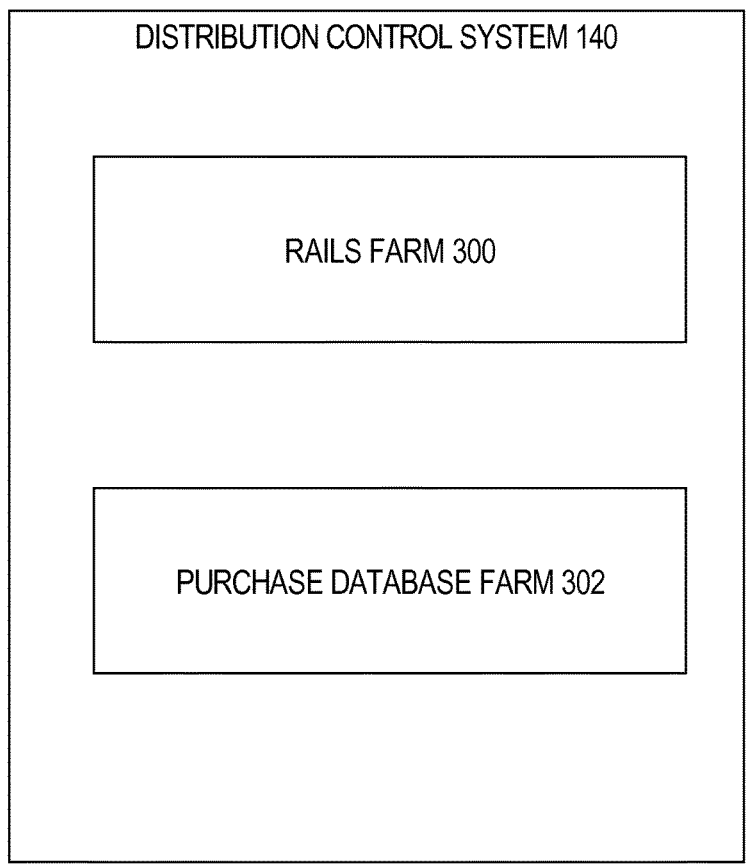
FIG. 3 is a block diagram illustrates components of a distribution control system within a source network, according to an embodiment of the invention.

Referring to FIG. 3, it is a block diagram illustrating distribution control system 140 in greater detail. In the embodiment illustrated in FIG. 3, distribution control system 140 includes a rails farm 300 and a purchase database farm 302. Rails farm 300 generally represents one or more computer systems responsible for handling purchase requests initiated within less-connected venues. Purchase database farm 302 generally represents one or more computer systems responsible for storing information about purchases of assets within the less-connected venues.

According to one embodiment, content distribution controller 130 specifies distribution rules that are automatically carried out by distribution control system 140. The rules specified by content distribution controller 130 may govern any aspect of the distribution of digital assets within target network 100, including but not limited to:
- the type, timing, and manner in which advertising is presented to users
- the type, timing, and manner in which promotions are presented to users
- which assets are made available to users
- when the assets are made available to the users
- the terms, including pricing, duration, transferability that govern asset consumption
- metadata (e.g. title, description, thumbnails) of the digital assets For example, content distribution controller 130 may establish a rule that, on a particular flight, all users that have previously viewed three honor movies are to be presented with a promotion that gives those users a 50% discount if they purchase two more horror movies.

The distribution rules may be very general (e.g. covering all users and all flights during a particular month), or very specific (e.g. covering only first class users on a particular flight on a particular day).

Example Asset Purchase Process

Content distribution controller 130 may employ distribution control system 140 to control the distribution of assets to any number of less-connected venues. Once distributed to the less-connected venues, users within the less-connected venue may purchase consumption of the assets (e.g. pay to watch movies). According to one embodiment involving the distribution of movies on an airplane, a purchase operation proceeds as follows.

Initially, a passenger logs in to the system. If the authentication gateway 108 determines that the log in information is valid, the user is able to request to watch a movie. The user may then request a purchase. If payment gateway 118 indicates that the payment was successful, a message is sent to rails farm 300 to serve the selected movie. Rails farm 300 determines whether the syntax of the request is valid, and whether a digital signature associated the request if valid. The digital signature may be, for example, a hash value generated as a security measure to prevent unauthorized consumption of the digital assets.

If both the syntax and signature are valid, rails farm 300 sends a message to purchase database farm 302, which logs the purchase in a purchase database. According to one embodiment, the purchase database stores a variety of information about each purpose. For example, in one embodiment, the purchase database farm 302 stores, for each purchase:

a UserID that identifies the user making the purchase
an EmbedCode
a DailyViewCount
a TotalViewCount
a RentalDuration
a PayAuthTokenID After storing the data associated with the purchase, purchase database farm 302 sends a hash value to rails farm 300, which in turn sends an encrypted checkout result to target network 100. According to one embodiment, the checkout result indicates not only that the user is authorized to watch the requested movie, but also indicates licensing terms that apply to that user's consumption of the movie. For example, the licensing terms may indicate that the user is only able to consume the movie during the next 48 hours.

Allowing Purchases in a Disconnected State

In some less-connected venues, there are periods during which connection 106 becomes completely severed. When connection 106 has been severed, target network 100 is in a "disconnected state" during which target network 100 cannot communicate with source network 102. For example, the target network of an airplane may enter a disconnected state as the plane travels over the ocean.

To sell more digital assets, it may be desirable to allow asset purchases to be initiated while target network 100 is in a disconnected state. Allowing such purchases is riskier for the content distribution controller 130, because users will thereby be able to consume the digital assets without the full security measures implemented by authentication gateway 108, payment gateway 118 and/or authorization gateway 120.

In embodiments that allow purchases in a disconnected state, target network 100 may additionally include a risk calculation module that estimates the risk associated with granting each disconnected-state purchase request. The risk estimates may be based on a variety of factors, such as (a) how much risk had already been incurred by granting other disconnected-state purchase requests, (b) the identity of the requestor (if ascertained prior to entering the disconnected state), and/or (c) the seating class of the requestor (e.g. whether the requestor is sitting in first class, business class, or economy). These are merely examples of the factors that may be used to estimate the risk of any disconnected-state purchase, and the techniques described herein are not limited to any particular risk factors. Regardless of how the risk is estimated, if the risk exceeds a particular threshold, the disconnected-state purchase request is denied. Otherwise, the purchase is allowed to proceed, and the user is allowed to begin consuming the digital asset.

When a disconnected-state purchase is allowed to proceed, information relating to the purchase is temporarily stored within the target network 100. The information stored in the target network 100 for a disconnected-state purchase may include, for example, all of the information required by authentication gateway 108, payment gateway 118, and authorization gateway 120 to approve connected-state purchases. Consequently, when connection 106 is re-established, the stored disconnected-state purchase information is sent over connection 106 to verify that the disconnected-state purchases should have been approved.

If any of authentication gateway 108, payment gateway 118 and authorization gateway 120 indicate that a disconnected-state purchase should not have been allowed, a message to that effect may be sent to asset server 122 to cause asset server 122 to cease providing the digital asset to the user. The user may also be provided a mechanism by which to remedy the problem that caused the authorization to fail. For example, if the user entered incorrect credit card information, asset server 122 may cease providing the asset to the user, and request the user to provide correct credit card information. If the user is able to remedy the problem, asset server 122 begins providing the asset to the user again, beginning at the location where playback ceased.

Gathering Usage Data when Disconnected

For a variety of reasons, it may be useful for content distribution controller 130 to know how users within target network 100 are interacting with the assets that are made available to them. For example, it may be helpful to know which thumbnails, within the catalog, were selected by users. As another example, it may be useful to know at what point users paused, replayed, and/or stopped playing a particular movie.

According to one embodiment, such usage data is collected within target network 100, and is pushed to distribution control system 140 when bandwidth is available to do so. For example, while connection 106 is otherwise being used to full capacity, or has been severed, target network 100 may locally store usage data about how users are interacting with assets. When connection 106 gets re-established and is not otherwise fully utilized, the batch of stored usage data may be sent over connection 106 to distribution control system 140.

Distribution control system 140 may make changes in response to the usage information that may affect the current flight, future flights, or both. For example, in response to determining that users of a particular flight are purchasing shorter movies rather than longer movies, distribution control system 140 may make more short movies available for purchase on that flight. As another example, if the usage data indicates that users are purchasing a particular genre of movie, such as sports movies, distribution control system 140 may make available more movies about sports.

As usage data is collected from one or many less-connected venues over time, certain purchasing trends may become apparent. Based on such purchasing trends, the distribution schedules used by distribution control system 140 may be modified. For example, if foreign language movies are purchased more frequently on flights between certain geographic regions, then distribution control system 140 may change the advertising and/or amount of foreign movies that are made available on flights between those geographic regions.

In one embodiment, usage data collected within a less-connected venue is also used to personalize the experience of users within that less-connected venue. For example, if the usage data indicates that a particular user has purchased several horror movies, then special advertising and/or promotions relating to horror movies may be presented to the user. According to one embodiment, target network 100 includes a personalization module that inspects that locally-collected usage data, and causes such personalization based on the collected usage data even while the target network 100 is in a disconnected state.

While in a connected state, usage information may be sent from target network 100 to source network 102 as the usage occurs. However, even when in a connected state, it may be desirable reduce the traffic on connection 106 by queuing the local usage data for certain periods of time, and then sending the queued usage data over connection 106 in batches. For example, usage data may be queued in five minute intervals, and then sent in a batch to source network 102 once every five minutes.

If target network 100 remains in a disconnected state for an extended period of time, a large amount of usage data may be generated. Because target network 100 has limited resources, the amount of queued usage data may exceed the amount of resources allocated for storing usage data. Under these circumstances, a variety of factors may be used to determine which usage data to keep, and which usage data to discard. For example, certain types of usage data (e.g. which type of movies users ordered) may be considered more valuable than other types of usage data (e.g. when users paused playback). Under these circumstances, when usage data begins to exceed the capacity of target network 100, usage data of the less valuable type may be deleted to make room for storing new usage data of the more valuable type.

Transferring a Session Initiated in a
Less-Connected Venue

Often, users are unable to finish consumption of a purchased asset while in a less-connected venue. For example, a user that has purchased a license to watch a particular movie during a flight may not be done watching the movie when the flight ends. Under these circumstances, it is desirable to enable to the user to continue to consume the asset through the source network 102. When continuing to watch the movie off the airplane, the user may use the same device that the user was using on the airplane, or a completely different device. For example, a user that was watching a movie on a smartphone while on the airplane, may want to continue to watch the movie on an internet-connected TV after exiting the airplane.

Various techniques are provided herein for allowing users to continue to consume assets that were being consumed in a less-connected venue upon leaving the less-connected venue. In one embodiment, enabling the continued consumption of an asset under these circumstances involves transferring the user's session state from the target network 100 to the source network 102. Transferring the session state may involve, for example, transferring purchase data, acknowledgement data, and entitlement data.

According to one embodiment, distribution control system 140 generates and maintains a unique token for each purchase that has been authorized for consumers in target network 100. The state of a user's session, along with the corresponding token, may be transferred from target network 100 to source network 102 either periodically, or in response to certain events (e.g. at the end of a flight). Once the session state has been transferred, the user can request resumption of asset consumption from any device connected to source network 102. When a request to resume consumption of an asset is received by distribution control system 140, the token is used to identify the appropriate session state. The session state is inspected to determine license terms and current playback position of the user. If the license terms permit the user to resume consumption, then distribution control system 140 causes the asset to be provided to the user over source network 102. In one embodiment, the digital asset data that is provided to the user over source network 102 when a session is resumed is from a copy of the digital asset that resides on the source network 102, rather than the copy of the digital asset that was cached on the target network 100.

The device and platform on which the user resumes consumption of an asset may be significantly different than the device and platform on which the user was consuming the asset on target network 100. For example, the user may have been watching a movie on the built-in entertainment system on the target network 100 of an airplane, but resume playback on a desktop computer, tablet, or personal digital assistant. Alternatively, the user may have been watching the movie on a tablet that wirelessly connected to target network 100, but resume playback on an Internet-enabled TV in a hotel room after the flight. Further, the initially playback may have used one playback platform, such as Silverlight, while the playback is resumes on a different playback platform, such as FLASH.

Prioritized Synchronization

As described above, when a connection between target network 100 and source network 102 has been re-established after a period during which connection 106 was severed, the local components on target network 100 synchronize with the components on source network 102. Various types of information may be communicated during the synchronization, including purchase information and various types of usage information. According to one embodiment, the order in which data is transferred during the synchronization operation is based on the type of the information.

For example, information that is deemed to be more important, such as session state information, is transferred first. Quickly transferring session state information may be important, for example, to enable users to immediately resume consumption of assets upon leaving the less-connected venue. Purchase information may also be transferred before other information during synchronization operations, to ensure that purchases made during an offline state are legitimate. After the more important information has been transferred, less important information is transferred. For example, after the session state and purchase information has been transferred, information may be transferred in the following order: usage data about which movies were viewed, usage data about which previews were viewed, usage data about when users stopped viewing movies, and usage data about when users paused movies.

By transferring data in order of importance, it is more likely that the important data will be completely communicated before connection 106 is once again severed. Thus, if an airplane is not in dock a sufficient amount of time for the synchronization to finish, at least the most relevant information would have been communicated.

Situation-Awareness in Non-Stationary
Less-Connected Venues

According to one embodiment, users within the non-stationary less-connected venues are provided content based on current conditions relating to their respective less-connected venues. For example, as the end of an airplane flight approaches, messages may be provided to users that are connected to target network 100 to indicate how much flight time remains for viewing the movies. As another example, as a flight time remaining decreases, front end 104 may cease to present certain movies for consumption. For example, when less than two hours remain on a flight, front end 104 may cease to make available for purchase those movies that are more than two hours long.

In addition to time, content may be presented to users based on their current geographic location. For example, as an airplane flies over the Grand Canyon, users may be presented with advertisements relating to tours of the Grand Canyon. Flights with a particular destination, such as Paris, may be presented with advertisements or promotions relating to Paris as the end of the flight nears.

Stationary Less-Connected Venues

The techniques described herein for distributing assets in less-connected venues have been described with examples within the context of airplane flights. However, less-connected venues are not limited to moving venues (e.g. airplanes, ships, trains) but also include stationary venues, such as remote outposts and hotels. In the case of stationary venues, the connection 106 between the target network 100 and the source network 102 may rarely become severed, but may still be insufficient to meet the consumption needs of the users of the target network 100.

For example, a hotel may have a reliable, 50 MB/sec connection to the Internet. However, that connection would quickly become saturated if five hundred hotel occupants attempted to watch movies at the same time. Therefore, pro-actively caching select digital assets into storage within the target network 100 may be desirable. By pushing copies of movies or other digital assets onto storage within the target network 100 of such venues, content distribution controller 130 improves (or makes possible) the viewing experience of the users and potentially increases the number purchases the users make. The likelihood of increased purchases is further increased by the ability for those users to continue their consumption of the assets when they leave the venue.

Further, the techniques described herein allow a content distribution controller 130 to exercise control over the user-experience, and the terms under which the assets are consumed, even though the cached copies of the assets reside on a target network 100 that may not be owned or controlled by the content distribution controller 130.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
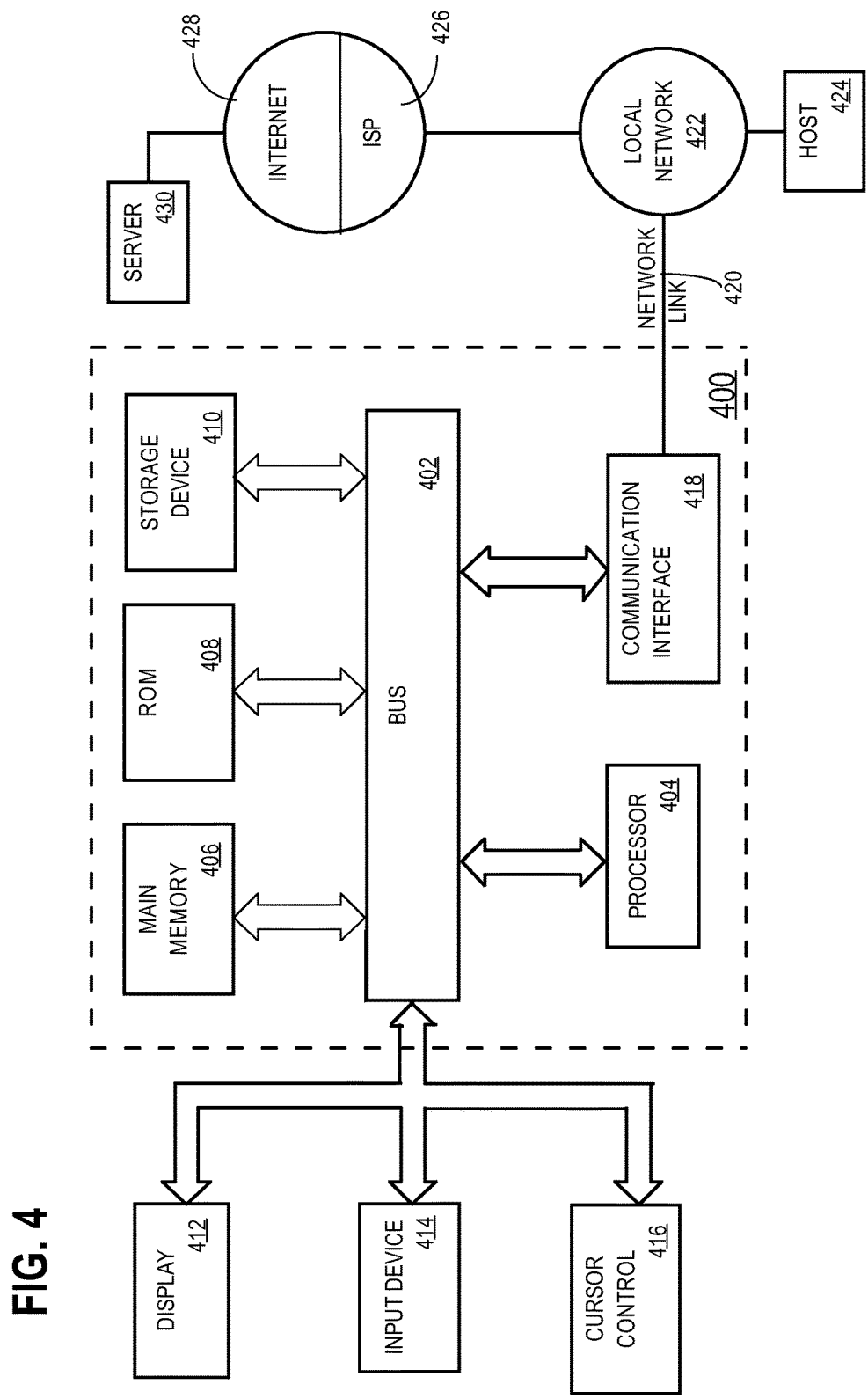
FIG. 4 is a block diagram of a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a airplane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a target network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through target network 422 to a host computer 424 or to data equipment operated by an Internet Service Provider (ISP) 426. ISP 426 in turn provides data communication services through the world wide packet data communication network now commonly referred to as the "Internet" 428. Target network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, target network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    prior to any of a plurality of users, within a target network of a less-connected venue, selecting any of a plurality of digital assets:
        making the plurality of digital assets that are stored on a higher-capacity source network available on the target network of the less-connected venue by caching copies of the plurality of digital assets within the target network, and
        prior to the target network being disconnected from the higher-capacity source network, transferring, by a content distribution controller from the higher-capacity source network to the target network, distribution control rule data to remotely control consumption of the copies of the plurality of digital assets within the less-connected venue;
    wherein the distribution control rule data causes the copies of the plurality of digital assets to be made available for consumption to the plurality of users within the target network based on one or more conditions described in the distribution control rule data, while disconnected from the higher-capacity source network;
    one or more first components on the target network of the less connected venue determining whether the one or more conditions described in the distribution control rule data are satisfied;
    based on the one or more first components on the target network of the less connected venue determining that the one or more conditions described in the distribution control rule data are satisfied, one or more second components on the target network of the less connected venue presenting the copies of the plurality of digital assets, different from the distribution control rule data and that comprise audio data or video data, for consumption by the plurality of users in the less-connected venue;
    determining that a first set of digital assets are to be cached on the target network for a particular period of time based on distribution rules specified by the content distribution controller;
    determining that, prior to the particular period of time, a second set of digital assets have already been cached on the target network based on the distribution rules specified by the content distribution controller;
    automatically scheduling for transfer to the target network, from the higher-capacity source network, only those digital assets from the first set that are not also in the second set; and
    wherein the method is performed by one or more computing devices.

2. The method of claim 1 wherein transferring the distribution control rule data is performed over a first connection between the target network and the higher-capacity source network.

3. The method of claim 2 wherein the copies of the plurality of digital assets are transferred from the higher-capacity source network to the target network using at least one of: a removable storage media device or a second connection between the target network and the higher-capacity source network.

4. The method of claim 1 wherein the less-connected venue is a non-stationary venue.

5. The method of claim 4 wherein the less-connected venue is one of: an airplane, a ship, a car, or a train.

6. The method of claim 1 wherein the less-connected venue is a stationary venue.

7. The method of claim 6 wherein the less-connected venue is a motel or hotel.

8. The method of claim 1 further comprising, in response to receiving a request to resume from a user, of the plurality of users, that began consuming a cached copy of a particular digital asset within the target network, presenting the particular digital asset on a device connected to the higher-capacity source network.

9. The method of claim 8 wherein:
the particular digital asset is a video; and
consuming includes resuming playback of the video at a location at which playback that was initiated within the less connected venue ended.

10. The method of claim 8 wherein the user began consuming the cached copy of the particular digital asset while the target network was disconnected from the higher-capacity source network.

11. The method of claim 1 further comprising loading the plurality of digital assets onto the target network by:
connecting a removable storage medium to the higher-capacity source network;
loading the copies of the plurality of digital assets onto the removable storage medium from the higher-capacity source network;
disconnecting the removable storage medium from the higher-capacity source network and connecting the removable storage medium to the target network; and
making the copies of the plurality of digital assets available on the target network from the removable storage medium.

12. The method of claim 1 wherein:
the copies of the plurality of digital assets include a first set of one or more digital assets, and a second set of one or more digital assets; and
the distribution control rule data specifies that
the first set of one or more digital assets are to be made available for consumption by the plurality of users, and
the second set of one or more digital assets are to be staged within the target network but not made available for consumption by the plurality of users.

13. The method of claim 1, wherein the one or more conditions are based on a geographic area in which to provide the copies of the plurality of digital assets for consumption to the plurality of users.

14. The method of claim 1, wherein the one or more conditions are based on a time period for providing the copies of the plurality of digital assets for consumption to the plurality of users.

15. A non-transitory computer-readable medium storing instructions which, when executed by one or more processors, cause performance of a method comprising the steps of:
prior to any of a plurality of users, within a target network of a less-connected venue, selecting any of a plurality of digital assets:
making the plurality of digital assets that are stored on a higher-capacity source network available on the target network of the less-connected venue by caching copies of the plurality of digital assets within the target network, and
prior to the target network being disconnected from the higher-capacity source network, transferring, by a content distribution controller from the higher-capacity source network to the target network, distribution control rule data to remotely control consumption of the copies of the plurality of digital assets within the less-connected venue;
wherein the distribution control rule data causes the copies of the plurality of digital assets to be made available for consumption to plurality of users within the target network when one or more conditions described in the distribution control rule data, while disconnected from the higher-capacity source network;
one or more first components on the target network of the less connected venue determining whether the one or more conditions described in the distribution control rule data are satisfied;
based on the one or more first components on the target network of the less connected venue determining that the one or more conditions described in the distribution control rule data are satisfied, one or more second components on the target network of the less connected venue presenting the copies of the plurality of digital assets, different from the distribution control rule data and that comprise audio data or video data, for consumption by the plurality of users in the less-connected venue;
determining that a first set of digital assets are to be cached on the target network for a particular period of time based on distribution rules specified by the content distribution controller;
determining that, prior to the particular period of time, a second set of digital assets have already been cached on the target network based on the distribution rules specified by the content distribution controller; and
automatically scheduling for transfer to the target network, from the higher-capacity source network, only those digital assets from the first set that are not also in the second set.

16. The non-transitory computer-readable medium of claim 15 wherein transferring the distribution control rule data is performed over a first connection between the target network and the higher-capacity source network.

17. The non-transitory computer-readable medium of claim 16 wherein the copies of the plurality of digital assets are transferred from the higher-capacity source network to the target network using at least one of: a removable storage media device or a second connection between the target network and the higher-capacity source network.

18. The non-transitory computer-readable medium of claim 15 wherein the less-connected venue is a non-stationary venue.

19. The non-transitory computer-readable medium of claim 18 wherein the less-connected venue is one of: an airplane, a ship, a car, or a train.

20. The non-transitory computer-readable medium of claim 15 wherein the less-connected venue is a stationary venue.

21. The non-transitory computer-readable medium of claim 20 wherein the less-connected venue is a motel or hotel.

22. The non-transitory computer-readable medium of claim 15 wherein the method further comprises, in response to receiving a request to resume from a user, of the plurality of users, that began consuming a cached copy of a particular digital asset within the target network, presenting the particular digital asset on a device connected to the higher-capacity source network.

23. The non-transitory computer-readable medium of claim 22 wherein:
the particular digital asset is a video; and consuming includes resuming playback of the video at a location at which playback that was initiated within the less connected venue ended.

24. The non-transitory computer-readable medium of claim 22 wherein the user began consuming the cached copy of the particular digital asset while the target network was disconnected from the higher-capacity source network.

25. The non-transitory computer-readable medium of claim 15 wherein the method further comprises loading the plurality of digital assets onto the target network by:
    connecting a removable storage medium to the higher-capacity source network;
    loading the copies of the plurality of digital assets onto the removable storage medium from the higher-capacity source network;
    disconnecting the removable storage medium from the higher-capacity source network and connecting the removable storage medium to the target network; and
    making the copies of the plurality of digital assets available on the target network from the removable storage medium.

26. The non-transitory computer-readable medium of claim 15 wherein:
    the copies of the plurality of digital assets include a first set of one or more digital assets, and a second set of one or more digital assets; and
    the distribution control rule data specifies that
        the first set of one or more digital assets are to be made available for consumption by the plurality of users, and
        the second set of one or more digital assets are to be staged within the target network but not made available for consumption by the plurality of users.

27. The non-transitory computer-readable medium of claim 15, wherein the one or more conditions are based on a geographic area in which to provide the copies of the plurality of digital assets for consumption to the plurality of users.

* * * * *